United States Patent
Kobal et al.

(10) Patent No.: US 7,099,828 B2
(45) Date of Patent: Aug. 29, 2006

(54) METHOD AND APPARATUS FOR WORD PRONUNCIATION COMPOSITION

(75) Inventors: Jeffrey S. Kobal, Lake Worth, FL (US); Bruce D. Lucas, Mohecan Lake, NY (US); David E. Reich, Jupiter, FL (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 10/007,615

(22) Filed: Nov. 7, 2001

(65) Prior Publication Data

US 2003/0088415 A1    May 8, 2003

(51) Int. Cl.
*G10L 21/00*    (2006.01)
*G10L 13/00*    (2006.01)
*G06F 3/00*    (2006.01)

(52) U.S. Cl. .................. 704/270; 704/258; 715/727
(58) Field of Classification Search ............. 704/270, 704/258, 243
See application file for complete search history.

(56) References Cited

U.S. PATENT DOCUMENTS

| | | | | |
|---|---|---|---|---|
| 4,831,654 A | * | 5/1989 | Dick ........................... | 704/260 |
| 5,278,943 A | * | 1/1994 | Gasper et al. ............... | 704/200 |
| 5,500,919 A | * | 3/1996 | Luther ......................... | 704/260 |
| 5,850,629 A | * | 12/1998 | Holm et al. ................. | 704/260 |
| 6,006,187 A | * | 12/1999 | Tanenblatt ................... | 704/260 |
| 6,092,044 A | * | 7/2000 | Baker et al. ................. | 704/254 |
| 6,233,553 B1 | * | 5/2001 | Contolini et al. ........... | 704/220 |
| 6,363,342 B1 | * | 3/2002 | Shaw et al. ................. | 704/220 |

* cited by examiner

*Primary Examiner*—David Hudspeth
*Assistant Examiner*—Brian L. Albertalli
(74) *Attorney, Agent, or Firm*—Akerman Senterfitt

(57) ABSTRACT

A method of generating pronunciation information can include graphically presenting at least one activatable visual identifier corresponding to individual ones of a plurality of phonemes. Responsive to a selection of one of the visual identifiers, pronunciation information can be generated in accordance with the selected visual identifier. The pronunciation information can be compiled responsive to a selection of one of the plurality of visual identifiers.

23 Claims, 3 Drawing Sheets

METHOD AND APPARATUS FOR WORD PRONUNCIATION COMPOSITION

BACKGROUND OF THE INVENTION

1. Technical Field

This invention relates to the field of speech-driven applications, and more particularly, to developing speech driven applications.

2. Description of the Related Art

In a speech recognition system, a component known as a speech recognition engine or recognizer can produce text words from a received audio stream representing user speech. Pronunciations, known as baseforms, stored within the speech recognizer can be used to convert received speech to text. For example, the word spelled "the" can have multiple pronunciations. One phonetic representation can be "TH EE", while another phonetic representation can be "TH UH". Simply stated, the recognizer can process an audio stream and generate a phonetic representation of the speech. If a word exists in the speech recognition system vocabulary which matches the phonetic representation, the text word can be returned by the recognizer.

Presently, only speech that is defined within the recognizer (i.e. pronunciations with corresponding text words) can be recognized. Accordingly, the development of a comprehensive speech application can be problematic due to the tremendous number of words which exist in various languages as well as the rate at which new words are invented. Further complicating the problem, speech applications frequently are called upon to recognize "pseudo-words" (such as user-ids and/or passwords). Defining all possible words and pseudo words is not only impractical, but is cost prohibitive as well.

Still, to develop comprehensive speech applications, the application developer must develop pronunciations. These pronunciations can be used with speech recognition and text-to-speech systems. To date, however, pronunciations have been generated by developers using a phonology listing and a text editor. Specifically, the developer types the spelling of a word, types the phonological representation of the spelling, and then compiles the text and phonological representation to build a vocabulary. The vocabulary then must be tested, refined, and recompiled until an acceptable model is developed.

SUMMARY OF THE INVENTION

The invention disclosed herein provides a method and system for specifying or composing a pronunciation of a portion of text. In particular, the invention provides a graphical tool through which users can specify a pronunciation for a given portion of text by selecting particular phonemes, or speech sounds, to be included within the pronunciation. Accordingly, the pronunciation can include phonemes, the ordering of the phonemes, as well as other pronunciation parameters relating to the stress and prosody of the text. The resulting pronunciation generated by the invention can be used with a speech recognition system or a text-to-speech system.

One aspect of the present invention can include a method of generating pronunciation information. The method can include graphically presenting at least one activatable visual identifier corresponding to individual ones of a plurality of phonemes. In one embodiment, the phonemes can include phonemes from two or more languages. Responsive to a selection of one of the visual identifiers, pronunciation information can be generated in accordance with the selected visual identifier. The pronunciation information can be compiled responsive to a selection of one of the plurality of visual identifiers. Additionally, the pronunciation information can be stored in a memory.

The generating step can include, for example, identifying at least one phoneme associated with the selected visual identifier and inserting the identified at least one phoneme into the pronunciation information or removing the identified at least one phoneme from the pronunciation information. If the pronunciation information includes a plurality of phonemes, the generating step can include reordering the plurality of phonemes of the pronunciation information.

If the pronunciation information includes at least one parameter, the generating step can include changing the at least one parameter of the pronunciation information. The parameter can be a stress parameter or a prosodic parameter. In any case, the method further can include playing an audio approximation of the pronunciation information responsive to a selection of one of the plurality of visual identifiers.

Another aspect of the invention can include a pronunciation composition tool including a library having a plurality of phonemes and a graphical user interface including a plurality of activatable visual identifiers corresponding to particular ones of plurality of phonemes. The phonemes can be from more than one language. Further, the composition tool can include a processor configured to generate pronunciation information by including selected ones of the plurality of phonemes from the library responsive to a selection of at least one of the activatable visual identifiers. Notably, the processor can be configured to modify the pronunciation information.

The pronunciation composition tool also can include a text-to-speech system configured to play an audio approximation of the pronunciation information responsive to activation of one of the activatable visual identifiers. A compiler can be included which can be configured to compile the pronunciation information for use with a speech driven application.

BRIEF DESCRIPTION OF THE DRAWINGS

There are shown in the drawings embodiments which are presently preferred, it being understood, however, that the invention is not so limited to the precise arrangements and instrumentalities shown.

DETAILED DESCRIPTION OF THE INVENTION

The invention disclosed herein provides a method and system for specifying or composing a pronunciation of a portion of text. More specifically, the invention provides a graphical tool through which users can specify a pronunciation for a given portion of text by selecting particular phonemes, or speech sounds, to be included within the pronunciation. The invention can generate pronunciation information, for example a coded representation of a pronunciation, which then can be compiled into a suitable form for use with a speech application. For example, the resulting pronunciation can be used for purposes of speech recognition and text-to-speech (TTS) processing. Accordingly, the pronunciation information can include phonemes, the ordering of the phonemes, as well as other pronunciation parameters relating to the stress and prosody of the text.

Pronunciations can be specified by selectively adding and/or removing particular phonemes using the graphical tool. Once included within a pronunciation, the graphical tool can be used to edit pronunciation information or reorder the phonemes. Additionally, rather than repetitively specifying an entire pronunciation in a text editor, compiling the pronunciation, and then listening to the results the present invention can continually play the pronunciation at any point within the pronunciation composition process so that a user can more efficiently edit the pronunciation information. It should be appreciated that the terms "text" and "word" (hereafter "word") as used herein can include one or more alphanumeric characters. Accordingly, the term "word" can include, but is not limited to, commonly used words, newly coined words, proper names, and pseudo words such as passwords and acronyms containing alphanumeric strings. The present invention can be used to specify pronunciations for any of the aforementioned words.

Notably, because the present invention uses phonemes to compose word pronunciations, the invention can be used to specify pronunciations of words in more than one language. For instance, the invention can include phonemes corresponding to particular languages or which are common to particular languages. Accordingly, the invention can be used to develop pronunciations for use with speech applications in more than one language.

Figure 1:
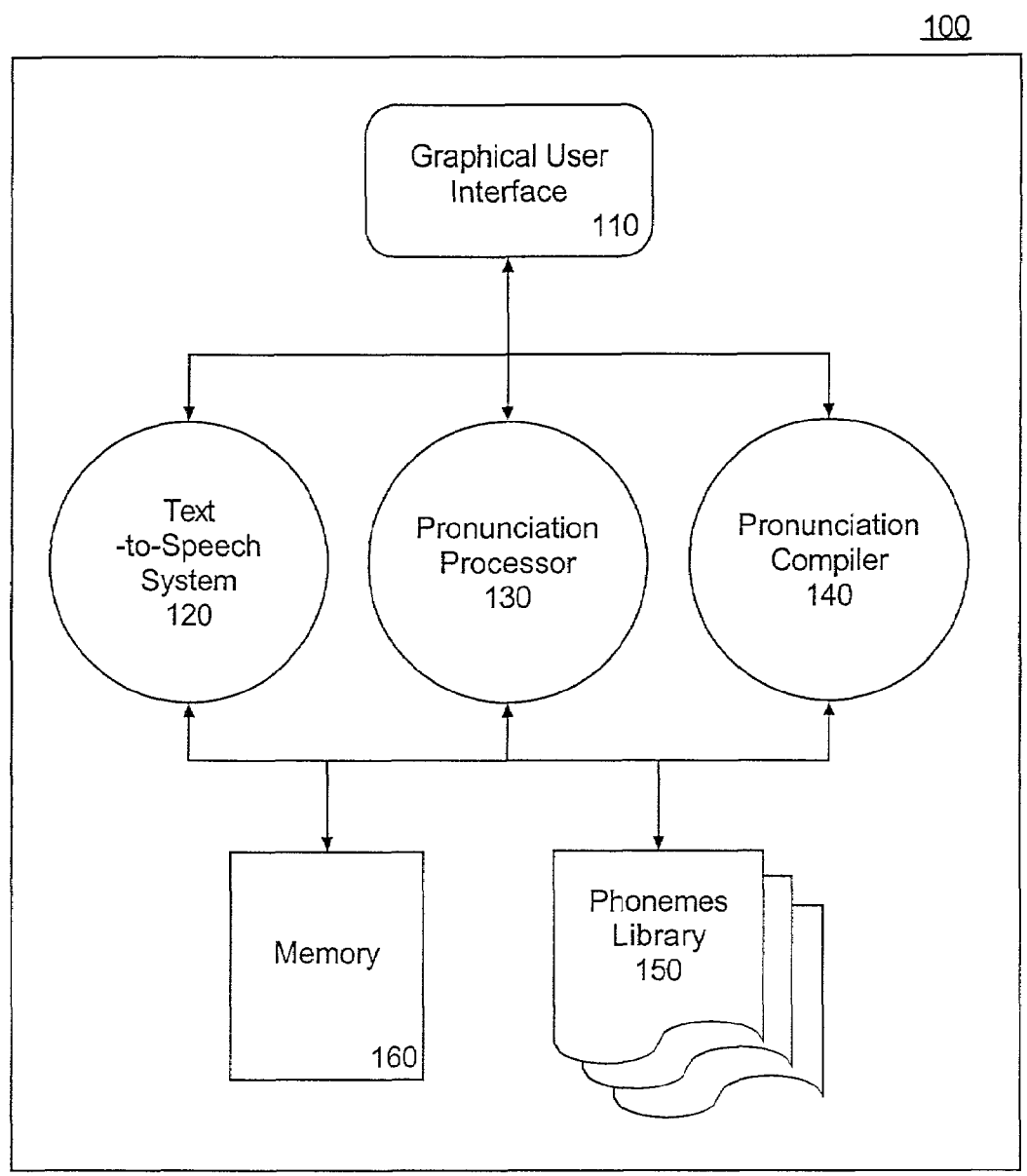
FIG. 1 is a schematic diagram illustrating an exemplary system for specifying pronunciations in accordance with the inventive arrangements disclosed herein.

FIG. 1 is a schematic diagram illustrating an exemplary system 100 for specifying pronunciations in accordance with the inventive arrangements disclosed herein. As shown in FIG. 1, system 100 can include a graphical user interface (GUI) 110, an optional TTS system 120, a pronunciation processor 130, an optional pronunciation compiler 140, as well as a phoneme library 150. A memory 160 also can be included for storing pronunciation information under development as well as finished and compiled pronunciations. Each of the aforementioned components can be communicatively linked with one another. For example, each of the aforementioned components can be incorporated within a single application program, can exist as separate application programs, or in various combinations thereof. Despite the particular implementation, system 100 can exist as a standalone tool or can be included within a larger speech application development system.

Figure 2:
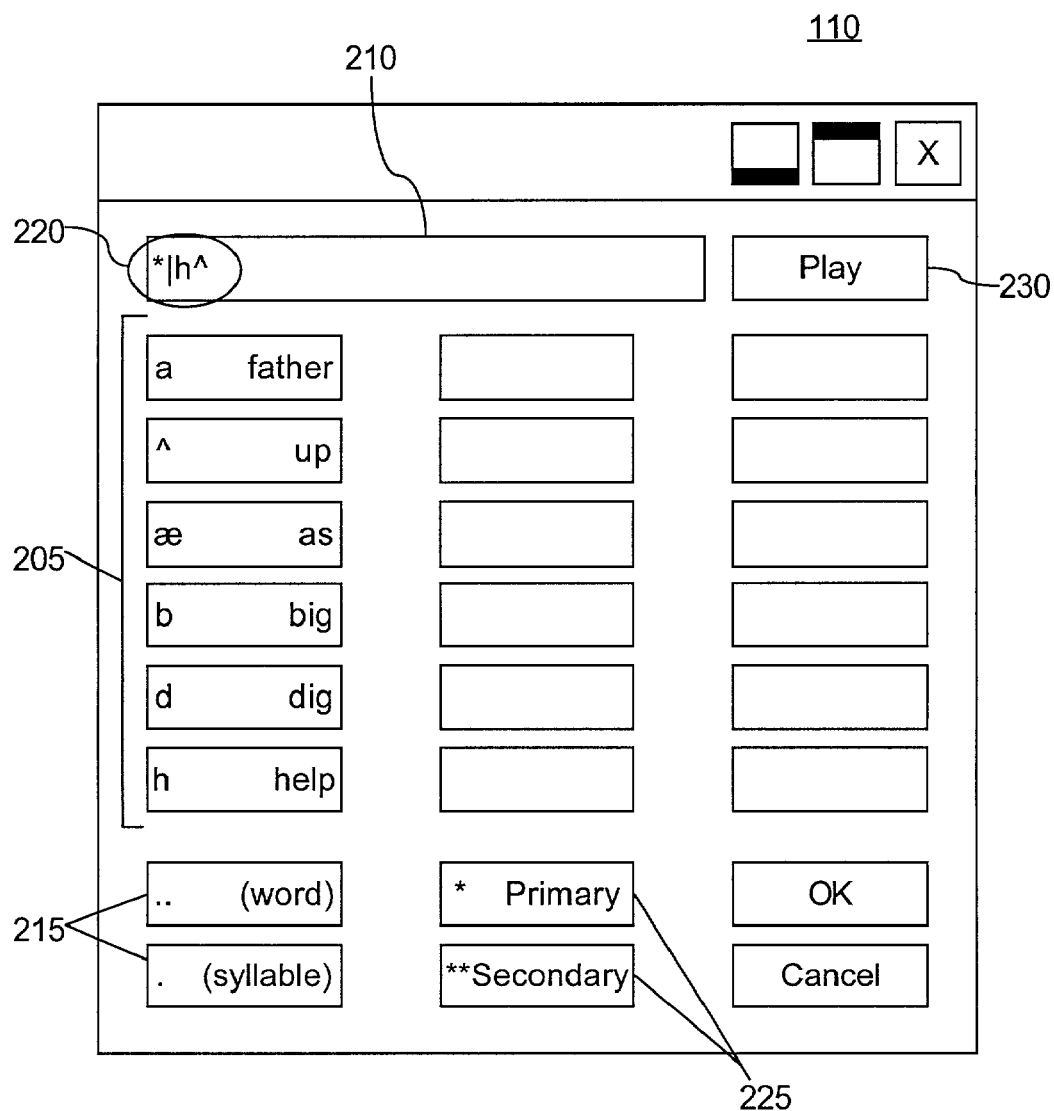
FIG. 2 is an exemplary graphical user interface which can be used with the inventive arrangements disclosed herein.

The GUI 110, which is described in greater detail with reference to FIG. 2, provides users with a visual mechanism for accessing and interacting with the underlying components of system 100. The phoneme library 150 can include a plurality of phonemes which can be used to specify pronunciations of words. In addition to phonemes, the entries of the phoneme library 150 can include information such as a coded component which can be compiled into a format suitable for input to a speech system, a component which can be interpreted by a TTS system for use during playback of a pronunciation, and a phonetic representation component which can be viewed and understood by a user. For example, the phonetic representation can be similar to the phonetic pronunciation commonly found in a dictionary.

It should be appreciated that each of the aforementioned components of the phonetic library entries need not be included as separate items of information. Rather, in one embodiment of the invention, one or more of the items can be used to derive the other components. For example, the user readable phonetic representation component can be translated into a form suitable for use with the TTS system or into pronunciation information to be compiled. In any case, the phoneme library 150 can include further information relating to the phonemes which can aid in compiling and classifying the phonemes. In the case where the phoneme library 150 includes phonemes for more than one language, the entries can include language designations allowing the phonemes to be classified accordingly.

The pronunciation processor 130 can generate and process pronunciation information which later can be compiled into a format suitable for use with a speech recognition system or a TTS system. As mentioned, pronunciation information can include, but is not limited to, features used by a speech recognizer to recognize speech such as the phonemes and the ordering of the phonemes relative to one another within a given word. The pronunciation processor 130 also can generate and process other pronunciation information which can be useful to a TTS system. This pronunciation information can include parameters such as whether a phoneme is to be primarily or secondarily stressed within a given word as well as the prosody of the word.

The pronunciation processor 130 can respond to user requests received through the GUI 110. The pronunciation processor 130 can access the phoneme library 150 to identify particular phonemes and use the identified phonemes to compose a pronunciation, i.e. generate pronunciation information. For example, identified phonemes can be inserted or removed from a given pronunciation. Moreover, the phonemes of a pronunciation can be reordered under the control of the pronunciation processor 130 and saved in memory 160.

The system 100 optionally can include a TTS system 120. The TTS system 120, as is well known in the art, can play pronunciations which are currently under development by a user. The TTS system 120 can be configured to interpret the pronunciation information such as phonemes, prosody, and stress information, generated by the pronunciation processor 130. Alternatively, the pronunciation processor 130 can translate pronunciation information into a format suitable for use by the TTS system 120. In any case, the TTS system 120 can provide an audible representation of the pronunciation information which approximates the pronunciation achievable through compiling the pronunciation information. Accordingly, as the pronunciation develops and evolves, the user can continually initiate playback of the pronunciation without compiling the pronunciation information. In this manner, the user can fine-tune a pronunciation as it is developed without having to first compile the pronunciation information into a format suitable for use with a speech application.

Finally, as shown in FIG. 1, system 100 can include an optional pronunciation compiler 140. The pronunciation compiler 140 can compile the pronunciation information into a binary format which can be understood by a conventional speech recognition or TTS system. As mentioned, the compiler 140, need not be included within the present invention.

In operation, a user can interact with GUI 110 to specify a language, phonemes, and other pronunciation information. The pronunciation processor 130 can receive the user specified information and can access the phoneme library 150. Accordingly, the pronunciation processor 130 can identify and retrieve these phonemes from the phoneme library 150 and insert the phonemes within an existing or a newly created pronunciation, thereby creating pronunciation information. The pronunciation information can be edited by the user through the GUI 110. Accordingly, the pronunciation processor 130 can perform any user specified edits to the pronunciation information such as removing a phoneme from a pronunciation, reordering the phonemes, or inserting prosodic and stress parameters. The processor can initiate other functions responsive to user requests through the GUI 110 such as playback of the pronunciation, saving the pronunciation, starting a new pronunciation, and the like. The pronunciation information can be stored in the memory 160 for compiling, playback, or further editing.

FIG. 2 is a pictorial illustration the GUI 110 of FIG. 1. As shown, GUI 110 can include a plurality of user activatable visual identifiers such as buttons, icons, or the like. These visual identifiers can correspond to one or more phonemes. For example, buttons 205 have been labeled with different phonemes as well as exemplary words illustrating the sound of the particular phoneme. Those skilled in the art will recognize, however, that any of a variety of indicia can be used to represent a phoneme and that the exemplary words need not be included on the buttons 205. Additionally, the buttons 205 are shown for purposes of illustration only, and are not meant to be an exhaustive listing of phonemes. In response to activation of one of the phoneme buttons, the corresponding phoneme can be retrieved from the phoneme library and inserted into window 210. As shown, window 210 includes a pronunciation under development 220 which can include one or more phonemes and other pronunciation parameters. Buttons 215 have been labeled with different prosodic parameters which can be inserted into the pronunciation 220 in window 210. Additional buttons 225 can be used to assign primary or secondary stress to a particular phoneme of pronunciation 220.

GUI 110 can include a button for initiating a "remove" state wherein selected phonemes or pronunciation parameters can be removed from a pronunciation responsive to user selection of the corresponding button. A play button 230 can initiate playback of the pronunciation 220 as displayed in window 210. Still, it should be appreciated that the GUI 110 can include other functions accessible through a menu or through additional buttons. These functions can include initiating a new pronunciation, saving a current pronunciation, opening an existing pronunciation for further editing, and the like. GUI 110 further can include a series of editing buttons (not shown) as are commonly available within word processors. Accordingly, rather than editing text, these buttons can shift phonemes left, right, or swap the ordering of two phonemes. GUI 110 can be configured to allow edits directly to the pronunciation information in the case where the cursor is placed in window 210. Accordingly, a user can manually select, cut, or paste phonemes, as well as manually type phonemes and mark locations in the pronunciation for the insertion of additional phonemes or parameters.

As previously mentioned, phonemes corresponding to different languages can be included within the phoneme library. Accordingly, as a user chooses a particular language in which to work, the set of phonemes, or at least a set of commonly used phonemes, for that particular language can be presented on the various buttons of GUI 110. For example, GUI 110 can be reconfigured with buttons corresponding to the phonemes of the user designated language, the phonemes of the user designated language can be mapped to the existing buttons of GUI 110, or if a small number of phonemes of the user designated language differ from the default language of the GUI 110, one or more specialized buttons can be added or removed from GUI 110 to accommodate the different phonemes. In another embodiment of the invention, all phonemes can be available to users for composing pronunciations.

Figure 3:
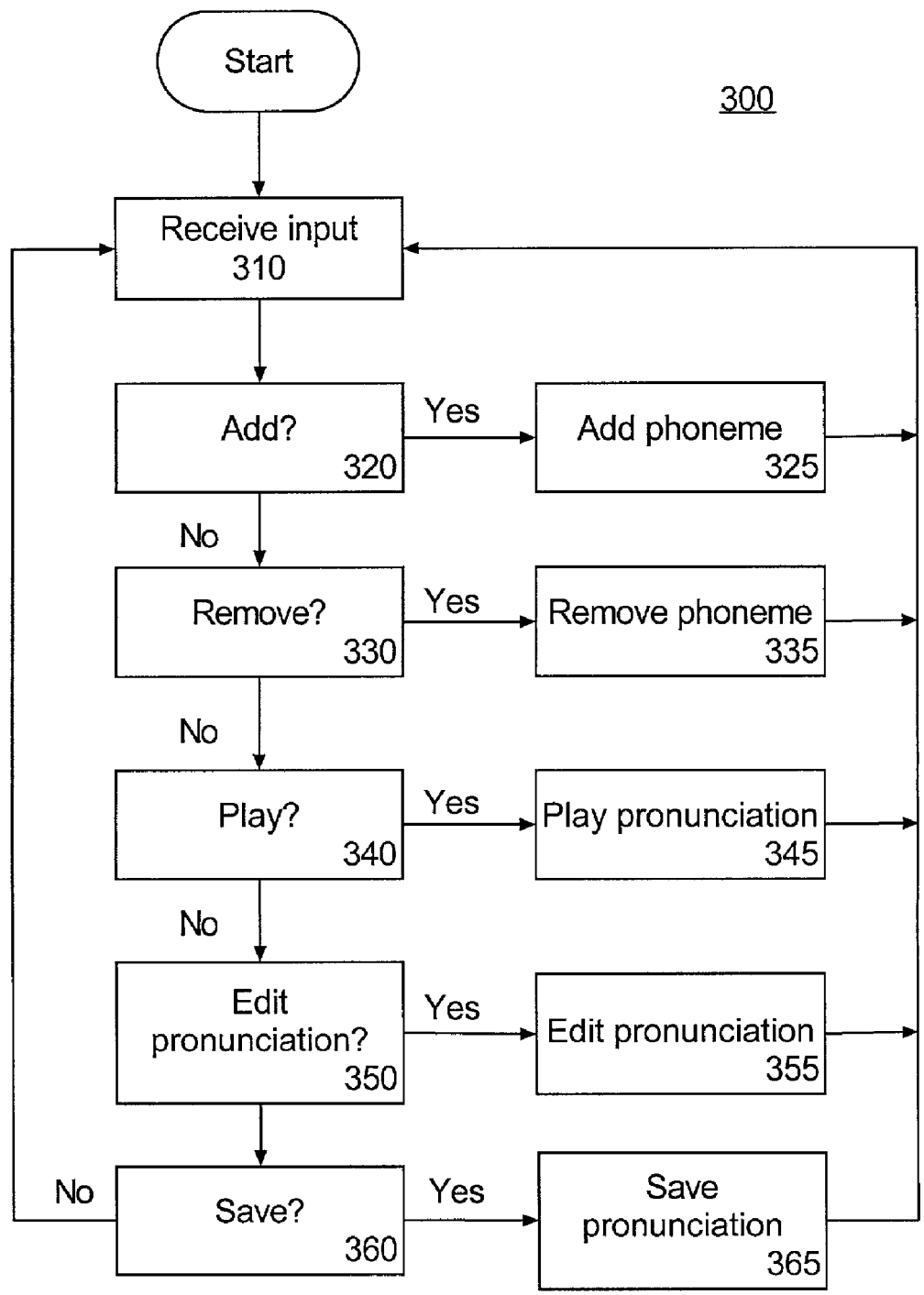
FIG. 3 is a flow chart illustrating an exemplary method of specifying a pronunciation in accordance with the inventive arrangements disclosed herein.

FIG. 3 is a flow chart 300 illustrating an exemplary method of specifying a pronunciation in accordance with the inventive arrangements disclosed herein. The method can begin in a state where a user has either opened an existing pronunciation or has started a new pronunciation. Regardless, the system 100 of FIG. 1 can be in a ready state awaiting input from the user through the exemplary GUI 110. Accordingly, in step 310, a user input can be received.

In step 320, if the input is a request to add a phoneme to the current pronunciation, the method can continue to step 325. If not, the method can continue to step 330. In step 325, the phoneme requested by the user, for example, the phoneme corresponding to the user selected button, can be inserted into the pronunciation under development. It should be appreciated that the phoneme can be inserted at the beginning of the pronunciation, the end of the pronunciation, or between any two phonemes already within the pronunciation. For example, the user can select an option specifying a default location for the insertion of phonemes such as "beginning" or "end". Also, phonemes can be inserted at the location of a cursor within the pronunciation. After completion of step 325, the method can continue to step 310 and repeat as necessary.

In step 330, if the input is a request to remove a phoneme from the current pronunciation, the method can continue to step 335. If not, the method can continue to step 340. In step 335, the phoneme corresponding to the user request can be removed from the current pronunciation. As mentioned, the phonemes can be removed from a pronunciation. For example, a phoneme can be selected and deleted using a delete key; a phoneme before or following the cursor can be deleted responsive to activation of a graphic button, or the GUI can be placed in a remove state such that selection of a phoneme button can remove the corresponding phoneme from the pronunciation. After completion of step 335, the method can continue to step 310 and repeat as necessary.

In step 340, if the input is a request to play the current pronunciation, i.e. the user has selected the "PLAY" button, the method can continue to step 345. If not, the method can continue to step 350. In step 345, an audio interpretation of the pronunciation can be generated and played. After completion of step 345, the method can continue to step 310 and repeat as necessary.

In step 350, if the input is a request to edit the pronunciation, the method can continue to step 355. In step 355, the action specified by the user can be performed. For example, phonemes can be reordered, prosodic information can be specified, and stress information can be specified and inserted into the current pronunciation. After completion of step 355, the method can continue to step 310 and repeat as necessary. If the input is not a request to edit the pronunciation information, the method can continue to step 360. In step 360, if the input is a request to save the current pronunciation, then the method can continue to step 365. If not, the method can continue to step 310 and repeat as necessary. In step 365, the current pronunciation can be stored in memory. For example, one or more conventional GUIs can be displayed allowing the user to specify a name for the current pronunciation, as well as a directory or storage location in memory. After completion of step 365, the method can continue to step 310 to repeat as necessary. Still, as previously mentioned, other functions can be performed. For example, the user can open a new session, compile the pronunciation data, and switch to another language.

The present invention can be realized in hardware, software, or a combination of hardware and software. In addition, the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other specific forms without departing from the spirit or essential attributes thereof, and accordingly, reference should be made to the following claims, rather than to the foregoing specification, as indicating the scope of the invention.

What is claimed is:

1. A computer-implemented method for composing a pronunciation of a portion of text by generating pronunciation information, the method comprising:

graphically displaying a first set of activatable visual identifiers, wherein the visual identifiers of said first set are simultaneously displayed in a single display, wherein each of the visual identifiers of said first set uniquely correspond to one of a plurality of phonemes, and wherein each visual identifier of said first set has a label that identifies the corresponding phoneme and that provides an explanatory word representing a sound of the corresponding phoneme;

graphically displaying a second set of activatable visual identifiers simultaneously with said first set of activatable visual identifiers, wherein each of the activatable visual identifiers of the second set uniquely corresponding to one of a plurality of prosodic parameters and has a label identifying the corresponding prosodic parameter;

graphically displaying a third set of activatable visual identifiers simultaneously with said first and second sets of activatable visual identifiers, wherein each of the activatable visual identifiers of the third set uniquely corresponds to one of a plurality or pronunciation stress parameters and has a label identifying the corresponding pronunciation stress parameter;

graphically displaying a fourth set of activatable visual identifiers simultaneously with said first, second, and third sets of activatable visual identifiers, wherein the visual identifiers of said fourth set are simultaneously displayed in said single display, and wherein each of the visual identifiers of the fourth set corresponds to one of a set of actions, said set of actions comprising an adding action, a removing action, and a reordering action for adding, removing, and reordering phonemes, prosodic parameters, and pronunciation parameters to a pronunciation presented in the single display when at least one activatable identifier of the first, second, and third sets is activated in combination with one of the visual identifiers of the fourth set;

responsive to a selection of at least one of said visual identifiers, generating said pronunciation information in accordance with said selected visual identifier, said pronunciation information comprising at least one of a phoneme selected from said plurality of phonemes, an ordering of selected phonemes, a pronunciation stress parameter, and a prosodic parameter;

enabling a user to compose said pronunciation by selectively performing at least one of adding a particular one of the plurality of phonemes, prosodic parameters, and pronunciation stress parameters, removing a particular one of the plurality of phonemes, prosodic parameters, and pronunciation stress parameters, and reordering at least two phonemes by activating at least two activatable visual parameters, said user's selection being based upon said pronunciation information and based upon at least one of an audible rendering of a portion of said pronunciation during said user's composing said pronunciation and without compiling said pronunciation information, an audible rendering of an exemplary word illustrative of a particular phoneme, and a visual rendering of an exemplary word illustrative of the particular phoneme; and compiling said pronunciation information responsive to a selection of one of said plurality of visual identifiers.

2. The method of claim 1, said generating step comprising:

identifying at least one phoneme associated with said selected visual identifier and inserting said identified at least one phoneme into said pronunciation information based on an audible rendering of a portion of said pronunciation during said user's composing said pronunciation and without compiling said pronunciation information.

3. The method of claim 1, said generating step comprising:

identifying at least one phoneme associated with said selected visual identifier and removing said identified at least one phoneme from said pronunciation information based on an audible rendering of a portion of said pronunciation during said user's composing said pronunciation and without compiling said pronunciation information.

4. The method of claim 1, wherein said pronunciation information comprises a plurality of phonemes, said generating step comprising:

reordering said plurality of phonemes of said pronunciation information.

5. The method of claim 1, wherein said generating step comprises:

changing said pronunciation information by changing at least one of a phoneme selected from said plurality of phonemes, an ordering of selected phonemes, a pronunciation stress parameter, and a prosodic parameter.

6. The method of claim 1, wherein said pronunciation information comprises a stress parameter and a prosodic parameter.

7. The method of claim 1, further comprising:

playing an audio approximation of said pronunciation information responsive to a selection of one of said plurality of visual identifiers.

8. The method of claim 1, wherein said plurality of phonemes includes phonemes from at least two languages.

9. The method of claim 1, further comprising:

storing said pronunciation information in a memory.

10. A pronunciation composition tool comprising:
a library comprising a plurality of phonemes;
a graphical user interface comprising a plurality of activatable visual identifiers, wherein said graphical user interface is configured to graphically display simultaneously
   a first set of activatable visual identifiers, wherein each of the visual identifiers of said first set uniquely correspond to one of a plurality of phonemes, and wherein each visual identifier of said first set has a label that identifies the corresponding phoneme and that provides an explanatory word representing a sound of the corresponding phoneme;
   a second set of activatable visual identifiers, wherein each of the activatable visual identifiers of the second set uniquely corresponds to one of a plurality of prosodic parameters and has a label identifying the corresponding prosodic parameter;
   a third set of activatable visual identifiers, wherein each of the activatable visual identifiers of the third set uniquely corresponds to one of a plurality of pronunciation stress parameters and has a label identifying the corresponding pronunciation stress parameter, and
   a fourth set of activatable visual identifiers, wherein the visual identifiers of aid fourth set are simultaneously displayed in said single display, and wherein each of the visual identifiers of the fourth set corresponds to one of a set of actions, said set of actions comprising an adding action, a removing action, and a reordering action for adding, removing, and reordering phonemes, prosodic parameters, and pronunciation parameters to a pronunciation presented in the single display when at least one activatable identifier of the first, second, and third sets is activated in combination with one of the visual identifiers of the fourth set; and
a processor configured to generate pronunciation information by including selected ones of said plurality of phonemes from said library responsive to a selection of at least one of said activatable visual identifiers and by enabling a user to compose said pronunciation by selectively causing said processor to perform at least one operation of adding a particular one of the plurality of phonemes and removing a particular one of the plurality of phonemes, said user causing said processor to perform at least one operation based upon said pronunciation information and at least one of an audible rendering of a portion of said pronunciation during said use's composing said pronunciation and without compiling said pronunciation information, an audible rendering of an exemplary word illustrative of a particular phoneme, and a visual rendering of an exemplary word illustrative of the particular phoneme.

11. The pronunciation tool of claim 10, farther comprising:
a text-to-speech system configured to play an audio approximation of said pronunciation information responsive to activation of one of said activatable visual identifiers.

12. The pronunciation composition tool of claim 10, further comprising:
a compiler configured to compile said pronunciation information for use with a speech driven application.

13. The pronunciation composition tool of claim 10, wherein said processor is further configured to modify said pronunciation information.

14. The pronunciation tool of claim 10, wherein said plurality of phonemes comprise phonemes corresponding to at least two languages.

15. A machine-readable storage, having stored thereon a computer program having a plurality of code sections executable by a machine for causing the machine to perform the steps of:
graphically displaying a first set of activatable visual identifiers, wherein the visual identifiers of said first set are simultaneously displayed in a single display, wherein each of the visual identifiers of said first set uniquely correspond to one of a plurality of phonemes, and wherein each visual identifier of said first set has a label that identifies the corresponding phoneme and that provides an explanatory word representing a sound of the corresponding phoneme;
graphically displaying a second set of activatable visual identifiers simultaneously with said first set of activatable visual identifiers, wherein each of the activatable visual identifiers of the second set uniquely corresponds to one of a plurality of prosodic parameters and has a label identifying the corresponding prosodic parameter;
graphically displaying a third set of activatable visual identifiers simultaneously with said first and second sets of activatable visual identifiers, wherein each of the activatable visual identifiers of the third set uniquely corresponds to one of a plurality of pronunciation stress parameters and has a label identifying the corresponding pronunciation stress parameter;
graphically displaying a fourth set of activatable visual identifiers simultaneously with said first, second, and third sets of activatable visual identifiers, wherein the visual identifiers of said fourth set are simultaneously displayed in said single display, and wherein each of the visual identifiers of the fourth set corresponds to one of a set of actions, said set of actions comprising an adding action, a removing action, and a reordering action for adding, removing, and reordering phonemes, prosodic parameters, and pronunciation parameters to a pronunciation presented in the single display when at least one activatable identifier of the first, second, and third sets is activated in combination with one of the visual identifiers of the fourth set;
responsive to a selection of at least one of said visual identifiers, generating said pronunciation information in accordance with said selected visual identifier, said pronunciation information comprising at least one of a phoneme selected from said plurality of phonemes, an ordering of selected phonemes, a pronunciation stress parameter, and a prosodic parameter,
enabling a user to compose said pronunciation by selectively performing at least one of adding a particular one of the plurality of phonemes, prosodic parameters, and pronunciation stress parameters, removing a particular one of the plurality of phonemes, prosodic parameters, and pronunciation stress parameters, and reordering at least two phonemes by activating at least two activatable visual parameters, said user's selection being based upon said pronunciation information and based upon at least one of an audible rendering of a portion of said pronunciation during said user's composing said pronunciation and without compiling said pronunciation information, an audible rendering of an exemplary word illustrative of a particular phoneme, and a visual rendering of an exemplary word illustrative of the particular phoneme; and
compiling said pronunciation information responsive to a selection of one of said plurality of visual identifiers.

16. The machine-readable storage of claim 15, said generating step comprising:

identifying at least one phoneme associated with said selected visual identifier and inserting said identified at least one phoneme into said pronunciation information based on an audible rendering of a portion of said pronunciation during said user's composing said pronunciation and without compiling said pronunciation information.

17. The machine-readable storage of claim 15, said generating step comprising:

identifying at least one phoneme associated with said selected visual identifier and removing said identified at least one phoneme from said pronunciation information based on an audible rendering of a portion of said pronunciation during said user's composing said pronunciation and without compiling said pronunciation information.

18. The machine-readable storage of claim 15, wherein said pronunciation information comprises a plurality of phonemes, said generating step comprising:

reordering said plurality of phonemes of said pronunciation information.

19. The machine-readable storage of claim 15, wherein said modifying step comprises:

changing said pronunciation information by changing at least one of a phoneme selected from said plurality of phonemes, an ordering of selected phonemes, a pronunciation stress parameter, and a prosodic parameter.

20. The machine-readable storage of claim 15, wherein said pronunciation information comprises a stress parameter and a prosodic parameter.

21. The machine-readable storage of claim 15, further comprising:

playing an audio approximation of said pronunciation information responsive to a selection of one of said plurality of visual identifiers.

22. The machine-readable storage of claim 15, wherein said plurality of phonemes include phonemes from at least two languages.

23. The machine-readable storage of claim 15, further comprising: storing said pronunciation information in a memory.

* * * * *